July 24, 1973    F. R. JOSLIN    3,748,252

ELECTRODE FOR SMALL HOLE ELECTROCHEMICAL MACHINING

Filed Oct. 7, 1971

INVENTOR
FREDERICK R. JOSLIN

BY Charles A. Warren
ATTORNEY

United States Patent Office 3,748,252
Patented July 24, 1973

3,748,252
ELECTRODE FOR SMALL HOLE ELECTRO-
CHEMICAL MACHINING
Frederick R. Joslin, Lebanon, Conn., assignor to United
Aircraft Corporation, East Hartford, Conn.
Filed Oct. 7, 1971, Ser. No. 187,492
Int. Cl. B01k 3/04; B23p 1/02
U.S. Cl. 204—284                                                     8 Claims

ABSTRACT OF THE DISCLOSURE

An electrode for electrochemically machining small holes which has a particular configuration at the working end and has a dielectric coating, preferably a polymer which is evaporated from the operative end of electrode by a pulse or pulses of radiation thereby vaporizing the coating and producing a tapering end surface on the coating which blends with the surface of the tube.

BACKGROUND OF THE INVENTION

While the electrode is in use, the electrolyte flows outwardly from the tube around the operative tip of the electrode and as the electrode enters the hole being machined, this electrolyte must flow outwardly around the electrode in discharging from the hole being machined. This flow and the evolution of gaseous hydrogen from adjacent non-insulated areas tends to loosen the dielectric and cause it to peel off the tube with the result that the electrochemical machining is no longer concentrated at the tip of the electrode and properly shaped and sized holes are not formed. This problem becomes increasingly greater with small diameter holes. One type of electrode is described in the copending application of Joslin, Ser. No. 54,496 filed July 13, 1970, and another form of electrode is described in the copending application of Shaw, Ser. No. 131,323 filed Apr. 5, 1971, and both having the same assignee as the present application. The present invention is another way for preparing the working tip of the electrode for long term operation.

SUMMARY OF THE INVENTION

One feature of the invention is an electrode that has a very thin dielectric coating preferably made of a polymer and with a coating terminating close to the tip in a tapering surface resulting from evaporating the dielectric by a high intensity beam such as a pulse of radiation. Another feature is the process of producing such an electrode. One particular feature is an electrode and the process of making it where the electrode, with the dielectric coating, is less than .030 inch in diameter.

According to the invention, the metallic tube is first cleaned externally and the end surface is then machined to the desired configuration. The tube is then coated with a dielectric preferably a polymer at least on the outer surface and the machined end surface. The dielectric is then vaporized from the end surface by a high intensity beam which vaporizes the dielectric and produces the desired tapering end surface on the dielectric at this point. This tapering end surface has such adherence to the tube that the flow of electrolyte past it and the evolution of gaseous hydrogen from the adjacent tube surfaces during use of the electrode does not tend to dislodge the dielectric from the tube.

DESCRIPTION OF THE PREFERRED EMBODIMENT

Figure 1:
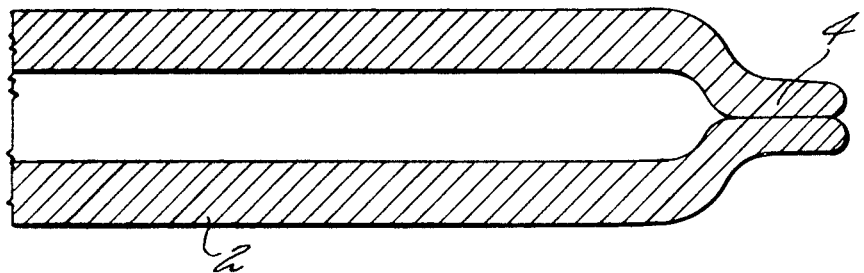
FIG. 1 is a sectional view of the tube with the end closed for tube cleaning.
Figure 2:
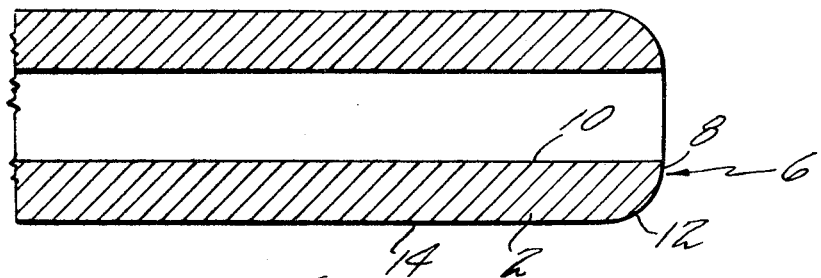
FIG. 2 is a sectional view of the tube with the closed end removed and the end configuration machined.

In the manufacture of this type of electrode, the tube is preferably a beryllium-copper tube 2 and since it is used for machining small holes, the tube is preferably less than .030 inch in outside diameter. The wall thickness with this diameter of tube is preferably .010 inch leaving an inside diameter of .010 inch. One particular tube that was made into an electrode and utilized had an inside diameter of .006 inch and outside diameter of .014 inch.

The first step in making the electrode is to close the end of the tube for a chemical cleaning operation, the closed end 4 preventing the entry of the cleaning chemical into the tube. This cleaning may be done in any of several ways as, for example, by dipping in a cleaning agent such as a bright dip for a period of 20 seconds. The tube is then rinsed and dried.

The next step is the formation of the operative end configuration on the tube. In doing this the closed end is machined off and an end surface 6 is formed. The inner part 8 of this end surface is at right angles to the axis of the tube and extends from the inner wall surface 10 of the tube to a point about halfway of the wall thickness of the tube. The rest of the end wall is smoothly curved as at 12 preferably on a radius to blend smoothly with the outer surface 14 of the tube.

Figure 3:
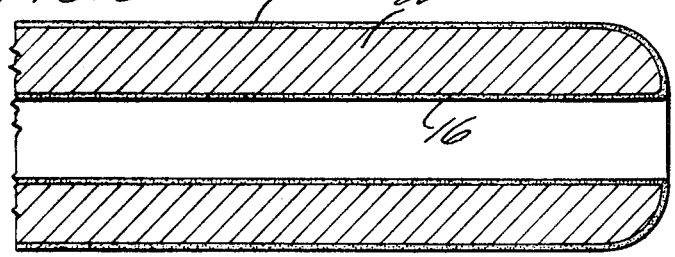
FIG. 3 is a corresponding sectional view of the tube after the dielectric is applied.
Figure 4:
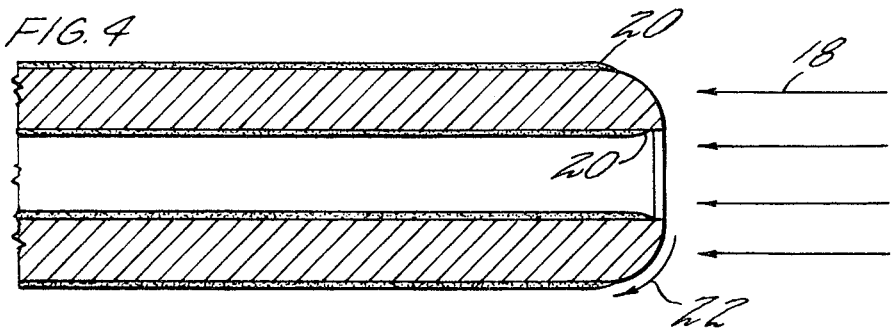
FIG. 4 is a similar view of the completed electrode ready for use.

The formed end and a portion of the tube at least as long as the depth of the hole to be machined is then coated with a very thin dielectric coating 16 preferably a polymer and particularly a parylene such as Parylene C which is a product of Union Carbide. This coating is applied to a depth adequate to insulate the electrode from the wall of the hole being machined and a thickness of about .0003 inch has been found to be acceptable. This coating is described, for example, in Union Carbide Letters Patent Nos. 3,288,728 and 3,342,754 and may be applied by use of the apparatus described in 3,246,627. As applied, the coating covers the prepared end as shown in FIG. 3 and as above stated extends along the tube for a distance greater than the depth of the hole to be machined.

This coating is then removed from the operative end of the tube by a pulse or pulses of radiation of suitable wavelength, power distribution and energy, for example, a $CO_2$ laser beam with a beam intensity to produce brief duration peak temperatures of around 450° C. This may be accomplished in a single 10.6 micron 5 microsecond 0.5 joule pulse or in some cases a second or third pulse. This completely vaporizes the polymer coating leaving no residue. With the high intensity beam directed as shown by the arrows 18, the polymer is removed from the end tip of the electrode and the dielectric terminates on the wall surfaces of the tube in a tapering or feathered end surface 20 smoothly blending with the wall surface of the tube and having such a secure attachment that the flow of electrode over this surface or the evolvement of gaseous hydrogen from adjacent tube areas does not tend to dislodge the insulation from the tube.

Although the dielectric and the feathered edge are shown on both inner and outer tube surfaces, the outer surface is especially important since it is along this surface that the flow of electrolyte occurs in the direction of the arrow 22, in a direction away from the electrode tip such that it has a tendency to peel the dielectric from the surface of the tube while the device is in use as an electrode. It has been found that the coating of the electrode in this way and the formation of the tapering end surfaces 20 produces an electrode that has considerably longer life than the more conventional electrode. Because of the thickness of the dielectric coating, the problems in mechanically producing such a tapering or feathered end edge or surface on the dielectric would be practically impossible of solution whereas the use of the radiation technique herein described readily produces the desired configuration. With the polymer completely vaporized, there is no residue to be removed and there is no probability that the very small inside diameter of the tube could be plugged or obstructed in any way by the removed polymer.

What is claimed is:

1. An electrode for use in electrochemically drilling small holes including a hollow metallic tube having an operative tip at one end and having a thin dielectric coating at least on the outside, this coating terminating adjacent to the operative tip in an end edge tapering toward the tip produced by vaporization of the dielectric at this point by a laser beam.

2. An electrode as in claim 1 in which the dielectric utilized is a polymer.

3. An electrode as in claim 1 in which the dielectric is very thin on the order of .0003 inch and the edge tapers toward the operative tip of the tool to a feathered edge.

4. An electrode as in claim 2 in which the dielectric is on both outside and inside of the tube and the tapering end surface is formed on the dielectric both outside and inside of the tube.

5. In the formation of an electrode for electrochemically drilling small holes in metals, the steps of:
   (1) forming an end surface on a metallic tube smaller in diameter than .030 inch,
   (2) coating the tube including said end surface with a very thin dielectric, and
   (3) vaporizing the dielectric from the end surface by a laser beam.

6. The process of forming an electrode as in claim 5 in which
   the operative end surface is formed to be at right angles to the axis of the tube from the inner tube surface for substantially one-half the thickness of the tube wall and the rest of the end surface curves smoothly to blend with the outer wall, and
   the vaporizing step removes the dielectric from the end surface back far enough to expose the smoothly curved end surface.

7. The process of forming an electrode as in claim 5 in which the coating step includes
   coating both inside and outside of the tube as well as the end surface.

8. The process of forming an electrode as in claim 5 in which the coating step includes:
   applying the coating to a thickness of about .0003 inch with a parylene and the vaporizing step is accomplished with the laser beam directed against the end of the tube in line with the axis of the tube.

References Cited
UNITED STATES PATENTS

| | | | |
|---|---|---|---|
| 3,051,638 | 8/1962 | Clifford et al. | 204—143 M |
| 3,352,770 | 11/1967 | Crawford et al. | 204—143 M |

FREDERICK C. EDMUNDSON, Primary Examiner

U.S. Cl. X.R.

204—224 M, 290 R